Patented May 3, 1949

2,469,132

UNITED STATES PATENT OFFICE 2,469,132

MANUFACTURE OF SULFUR COMPOUNDS

Walter A. Schulze and Willie W. Crouch, Bartlesville, Okla., assignors to Phillips Petroleum Company, a corporation of Delaware No Drawing. Application August 4, 1944,
Serial No. 548,146

8 Claims. (Cl. 260—79)

This invention relates to the synthesis of novel unsaturated sulfur-containing compounds. More particularly the present invention is concerned with the production of useful liquid and/or semi-solid polymer-like sulfur compounds through the chemical interaction of selected mercaptans with polymeric components of butadiene-comonomer emulsion systems.

We have found that viscous liquid and/or semi-solid sulfur compounds result from the interaction of selected mercaptans, butadiene and selected polymerizable compounds such as styrene, acrylonitrile and dienes other than butadiene, by subjecting a soap emulsion of such components to the action of a catalyst having oxidizing characteristics. The resultant unsaturated sulfur compounds having molecular weights ranging from about 500 to about 3000 may be variously employed as plasticizers, adhesives, drying oils, binding agents and the like.

It is an object of this invention to produce novel liquid and/or semisolid sulfur compounds from emulsion reaction systems containing butadiene.

It is a further object of this invention to prepare polymer-like sulfur compounds of desirable tack and plasticity from butadiene-comonomer emulsion systems containing selected mercaptans.

An additional object is to effect the chemical combination of selected mercaptans with aqueous emulsions of butadiene and other comonomers in such a manner as to yield polymer-like products containing substantial amounts of combined sulfur.

The present invention involves a process of making an unsaturated organic-sulfur-containing composition of matter having a liquid to semi-solid consistency comprising forming an aqueous emulsion of butadiene, an unsaturated comonomer, and an aliphatic mecaptan having from 10 to 16 carbon atoms per molecule, the mercaptan being present in amount ranging from 10 to 50 weight per cent of the butadiene and comonomer, the emulsion containing a polymerization catalyst, subjecting the emulsion to conditions effecting polymerization, and recovering the polymerization product from the resulting reaction mixture.

After the desired degree of polymerization has been attained, the reaction mixture may be treated to remove any unconverted reactants. These may be removed in any known way, for example, by vacuum distillation. The polymeric reaction product is then broken out of the emulsion by addition of a coagulating agent such as sulfuric acid whereupon the polymeric material rises to the surface and forms a supernatant oil layer. This oily layer is then separated from the water layer and may be dissolved in any suitable volatile organic solvent. An oxidation inhibitor typified by phenyl-beta-naphthylamine may then be added, whereupon the solvent and any residual water are driven off by distillation. It is preferred to use a solvent which forms a minimum-boiling azeotrope with water. An excess of the solvent over the amount required to form an azeotrope with all of the water is preferred.

The emulsion is formed and the polymerization is conducted exactly in accordance with conventional emulsion polymerization practice in the manufacture of butadiene-comonomer synthetic rubber, the feature which characterizes the present invention being the relatively large amount of the mercaptan in contrast to the extremely small amount used in making synthetic rubber. For example, a recipe frequently used in making butadiene-styrene synthetic rubber is the following:

| Component | Parts by Weight |
|---|---|
| Butadiene | 75 |
| Styrene | 25 |
| Soap | 5 |
| Water | 180 |
| Initiator ($K_2S_2O_8$) | 0.3 |
| Modifier (Dodecyl Mercaptan) | 0.5 |

The polymerization of such a formulation may be conducted at 50° C. for a period of time of 14 hours which results in a polymerization of about 76% of the butadiene and styrene, approximately 24% remaining unreacted. It will be understood that the ratio of butadiene to styrene in the polymer (or co-polymer) is not necessarily the same as in the monomeric charge; for example with the recipe given, at 76% polymerization, the polymer consists of 79% butadiene and 21% styrene. In the same way the three ingredients of the material prepared in accordance with the present invention may not appear in the same proportions that they had in the charge.

We have found that the use of a relatively large amount of the high molecular weight mercaptan exerts a profound effect upon the properties of the resulting polymer. While the theory underlying this is not understood, it has been definitely ascertained that the mercaptan enters into the reaction and is chemically combined in the product which contains chemically combined sulfur in a proportion corresponding to the amount of mercaptan that has disappeared.

The proportion of mercaptan may range from 10 to 50 weight per cent of the butadiene and comonomer. Usually the proportion is from 25 to 50 per cent.

The relative proportions of butadiene and comonomer may vary widely between limits similar to those which apply in the manufacture of butadiene-comonomer synthetic rubber. Generally butadiene makes up from 50% to 95% of the combined weight of butadiene and comonomer.

The temperature at which the polymerization is conducted in accordance with the present invention is likewise variable within the limits commonly employed in making butadiene comonomer synthetic rubber, e. g., from 40 to 60° C. and usually 50° C.

The time of reaction may vary from 4 to 20 hours, depending upon the other conditions and the extent of polymerization desired. Often a time of 16 hours is preferred.

The sulfur content of the product will usually range from 1 to 5 per cent, and corresponds to the amount of mercaptan caused to chemically combine by means of the reaction.

The comonomer used in conjunction with the butadiene may be any suitable polymerizable unsaturated organic material heretofore co-polymerized with butadiene by emulsion methods. Styrene and acrylonitrile are the preferred comonomers. A less commonly used comonomer is methyl methacrylate.

The amount of water used in preparing the emulsion is ordinarily the same as that used in the emulsion polymerization of butadiene and a comonomer to make synthetic rubber of this type. Usually the amount of water is in substantial excess of the combined weights of butadiene, comonomer and mercaptans.

Any of the well-known catalysts used in emulsion polymerization of butadiene and a comonomer may be employed. Examples are potassium persulfate, organic acid peroxides such as fatty acid peroxides, such as acetyl peroxide, propionyl peroxide, butyryl peroxide, acetyl propionyl peroxide, acetyl butyryl peroxide, benzoyl peroxide, hydrogen peroxide, etc. either singly or in combination. The proportion of catalyst may be the same as in making butadiene comonomer synthetic rubber. Usually the catalyst will be present in amount less than 1% of the total emulsion.

The mode of operation of the process of this invention may be illustrated with a reaction system comprising substantially equal parts by weight of butadiene, styrene and an aliphatic mercaptan containing about 12 carbon atoms per molecule. The reactants are emulsified with an aqueous solution containing suitable emulsifying agents and polymerization catalysts such as persulfates, peroxides and the like. The emulsion is continuously agitated during the reaction period while maintaining the temperature at about 50° C. Since the characteristics of the product are determined by the nature and proportion of reactants, operation for maximum conversion is ordinarily practiced. At the conclusion of the reaction period any unconverted reactants are recovered by a conventional steam stripping operation and the product is broken out of the emulsion by the addition of a suitable coagulating agent. The supernatant oil layer is mechanically separated and dissolved in solvents such as chloroform, benzene or benzene-alcohol mixtures for further purification treatment. Oxidation inhibitors, such as phenyl-beta-naphthylamine, are ordinarily added at this point and the product is dehydrated in a distillation operation by the azeotropic action of the solvent or solvents.

The exact nature of the chemistry involved in the present process is obscure; however, consideration of certain factors may be of value in limiting the scope of possible mechanisms thereby serving to differentiate our process from ordinary copolymerization reactions. It is known that certain mercaptans have been combined with styrene and other mono-olefins in the presence of peroxide type catalysts to give saturated sulfides which are known to be quite resistant to polymerization even under severe conditions. The product of reaction between mercaptans and butadiene would presumably be an unsaturated sulfide and, therefore, theoretically capable of undergoing polymerization. However, there is no existing art showing copolymerization of unsaturated sulfides to produce sulfur compounds comparable to those derived from this process. It is further recognized that the high molecular weight butadiene-styrene copolymers will combine with mercaptans; however, such a combination involving copolymer units of molecular weight in the region of 200,000 to 300,000 or higher results in no appreciable change in the characteristics of the polymer.

The amount of mercaptan used in our process may vary from 10 per cent to as much as 50 per cent of the total monomer charge. It is essential that a mercaptan of good purity be used in the reaction in order to insure a product possessing the desired characteristics. While the nature of the polymeric products of this invention may be influenced to a certain extent by variations in the proportions of the comonomers, the primary control resides almost exclusively in the type and quantity of mercaptan employed.

The preferred mercaptan types of the present process are those containing predominantly tertiary mercaptans and are selected from the group having carbon skeletons of from about 10 to 16 carbon atoms per molecule. The preferred mercaptan types may be further characterized by their method of preparation which comprises the catalytic addition of hydrogen sulfide to selected fractions of polymerized light olefins. By appropriate variations in polymerization formulas, primary and secondary mercaptans from different sources may be used to prepare sulfur-containing products which may in some cases possess properties comparable to those derived through the use of the preferred mercaptans.

The following specific examples are included to further illustrate the present invention; however, it is not intended that the invention be restricted to these exemplary operations. The parts are by weight.

*Example I*

Sulfur compounds were prepared in two experiments involving variable proportions of butadiene and styrene. The exact proportions of the butadiene, styrene and a mixture of $C_{11}$ to $C_{13}$ mercaptans (with an average mercaptan sulfur content of 15.6%) are given in the subjoined tabulation along with other pertinent data. In each experiment the mixture of reactants was emulsified in 185 parts of 3 per cent sodium oleate solution containing 0.3 part of potassium persulfate. The emulsion systems were agitated for 16 hours at 50° C. to complete the reaction. In processing the reaction product, the emulsions were broken with dilute sulfuric acid to yield supernatant oil layers which were separated and dissolved in a mixture of 2 parts of isopropyl alcohol and 5 parts of benzene. Phenyl-beta-naphthylamine amounting to 2.5 per cent by weight was added at this point prior to removal of water and solvent by distillation under diminished pressure. In each case the yield of viscous oil amounted to more than 75 per cent of the total weight of reactants. Product molecular weights were determined by viscosity measurements on benzene solutions.

| Experiment | I | II |
| --- | --- | --- |
| Butadiene charge, parts | 75 | 50 |
| Styrene charge, parts | 25 | 50 |
| $C_{11}$ to $C_{13}$ mercaptans charge, parts (mercaptan sulfur content 15.6%) | 25 | 25 |
| Reaction time, Hrs | 16 | 16 |
| Reaction temperature, °C | 50 | 50 |
| Product molecular weight | 1,800 | 1,200 |
| Product sulfur content, weight per cent | 3.7 | 3.5 |

*Example II*

Viscous sulfur compounds were prepared in two sets of experiments using a butadiene-acrylonitrile-mercaptan emulsion reaction system. The reactants were emulsified in sodium oleate solution containing added catalyst as described in Example I and the reaction was carried out in the manner previously set forth. The results of the two syntheses are tabulated below:

| Reaction system | I | II |
| --- | --- | --- |
| Butadiene charge, parts | 93.75 | 50.0 |
| Acrylonitrile, parts | 6.25 | 50.0 |
| $C_{12}$ mercaptan, parts (mercaptan sulfur 15.8%) | 25.00 | 37.5 |
| Reaction time, Hrs | 16 | 16 |
| Reaction temperature, °C | 50 | 50 |
| Product molecular weight | 2,900 | 500 |
| Product sulfur content, weight per cent | 2.8 | 3.3 |

*Example III*

Organic sulfur derivatives similar to those of system II, Example II were prepared with a greatly shortened reaction time. The reactants comprising 66.7 parts of butadiene, 33.3 parts of acrylonitrile and 33.3 parts of a tertiary alkyl mercaptan mixture of boiling range 220-245° C. were emulsified in 185 parts of 3 per cent sodium oleate solution containing 0.3 part of potassium persulfate as in Examples I and II. The reaction system was then agitated for 4 hours at 50° C. prior to recovery of products as previously described. The yield of viscous oil amounted to 84 per cent of the total charge of reactants. The molecular weight of the product in this instance was 700 while the sulfur content was 3.5 per cent by weight.

We claim:

1. The process of making an unsaturated organic sulfur-containing composition of matter having a liquid to semi-solid consistency which comprises forming an aqueous emulsion of conjugated butadiene, styrene, and an aliphatic mercaptan having from 10 to 16 carbon atoms per molecule and containing a single SH group in addition to carbon and hydrogen, said butadiene making up from 50 to 95 per cent of the combined weight of said butadiene and styrene and said mercaptan being present in an amount ranging from 10 to 50 weight per cent of said butadiene and styrene, said emulsion containing a polymerization catalyst having oxidizing characteristics, and subjecting said emulsion to conditions effecting polymerization.

2. The process of making an unsaturated organic sulfur-containing composition of matter having a liquid to semi-solid consistency which comprises forming an aqueous emulsion of conjugated butadiene, an unsaturated organic comonomer polymerizable therewith in aqueous emulsion selected from the group consisting of styrene, acrylonitrile, and methyl methacrylate and an aliphatic mercaptan having from 10 to 16 carbon atoms per molecule and containing a single SH group in addition to carbon and hydrogen, said butadiene making up from 50 to 95 per cent of the weight of said butadiene and comonomer and said mercaptan being present in an amount ranging from 10 to 50 weight per cent of said butadiene and comonomer, said emulsion containing a polymerization catalyst having oxidizing characteristics, and subjecting said emulsion to conditions effecting polymerization.

3. A process according to claim 2 wherein the aliphatic mercaptan is a tertiary mercaptan.

4. A process according to claim 2 wherein the mercaptan is present in an amount ranging from 25 to 50 weight per cent of the butadiene and comonomer.

5. A process according to claim 2 wherein the polymerization is effected at a temperature of 40 to 60° C. and at a reaction time of 4 to 20 hours.

6. A process according to claim 2 wherein the catalyst is present in an amount less than 1 per cent of the total emulsion.

7. A novel composition of matter which comprises an unsaturated organic sulfur-containing product of from 1 to 5 per cent sulfur and of molecular weight of 500 to 3,000; said composition being further characterized as the product derived from the interaction in an aqueous emulsion of conjugated butadiene, styrene and an aliphatic mercaptan having from 10 to 16 carbon atoms per molecule and containing a single SH group in addition to carbon and hydrogen, said butadiene making up from 50 to 95 per cent of the combined weight of said butadiene and styrene, and said mercaptan being present in an amount ranging from 10 to 50 weight per cent of said butadiene and styrene.

8. A novel composition of matter which comprises an unsaturated organic sulfur-containing product of from 1 to 5 per cent sulfur and of molecular weight of 500 to 3,000; said composition being further characterized as the product derived from the interaction in an aqueous emulsion of conjugated butadiene, an unsaturated organic comonomer polymerizable therewith in aqueous emulsion selected from the group consisting of styrene, acrylonitrile, and methyl methacrylate and an aliphatic mercaptan having from 10 to 16 carbon atoms per molecule and containing a single SH group in addition to carbon and hydrogen, said butadiene making up from 50 to 95 per cent of the combined weight of said butadiene and comonomer, and said mercaptan being present in an amount ranging from 10 to 50 weight per cent of said butadiene and comonomer.

WALTER A. SCHULZE.
WILLIE W. CROUCH.

REFERENCES CITED

The following references are of record in the file of this patent:

UNITED STATES PATENTS

| Number | Name | Date |
| --- | --- | --- |
| 2,281,613 | Wollthan | May 5, 1942 |
| 2,347,182 | Coffman | Apr. 25, 1944 |
| 2,351,108 | Collins | June 13, 1944 |
| 2,352,435 | Hoeffelman | June 27, 1944 |